Sept. 21, 1943.   V. L. STOFFER   2,329,796
RUBBER COVERED ROLL AND METHOD OF MAKING SAME
Filed Oct. 2, 1941

Inventor
Virgil L. Stoffer
By Willis F. Avery
Atty.

Patented Sept. 21, 1943

2,329,796

UNITED STATES PATENT OFFICE 2,329,796

RUBBER COVERED ROLL AND METHOD OF MAKING SAME

Virgil L. Stoffer, Akron, Ohio, assignor to The B. F. Goodrich Company, New York, N. Y., a corporation of New York Application October 2, 1941, Serial No. 413,320

7 Claims. (Cl. 18—59)

This invention relates to the manufacture of rubber-covered rolls and is useful for example in the manufacture of wringer rolls.

Rubber-covered rolls heretofore have sometimes presented the difficulty that moisture coming in contact with the end of the roll has tended to rust the shaft and loosen and separate the rubber from the shaft. The incorporation of protective bushings on the shaft at the ends of the roll as practiced heretofore has not been entirely satisfactory owing to the lack of adequate attachment of the hard rubber bushings to the shaft, the bushings having been difficult to attach effectively to the shaft and having often moved along the shaft to an undesired position by the pressures upon them during molding of the roll.

The present invention aims to overcome these and other difficulties and to provide an improved article and method of procedure.

The principal objects of the invention are to provide a secure bond between the hard rubber bushing and the shaft, and to provide against improper location of the bushings during the molding operation.

These and other objects will appear from the following description and the accompanying drawing.

Figure 1:
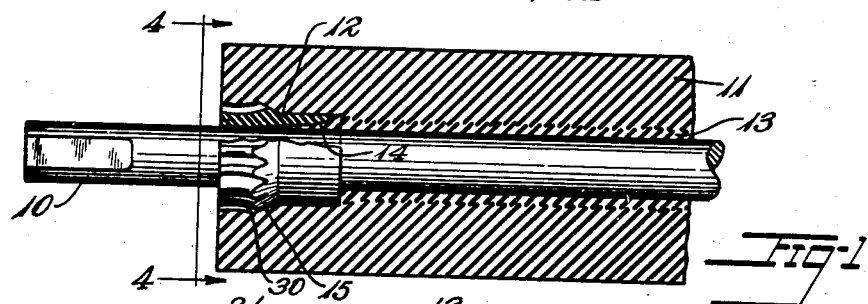
Fig. 1 is a longitudinal sectional view of one end of a roll constructed in accordance with and embodying the invention.
Figure 2:
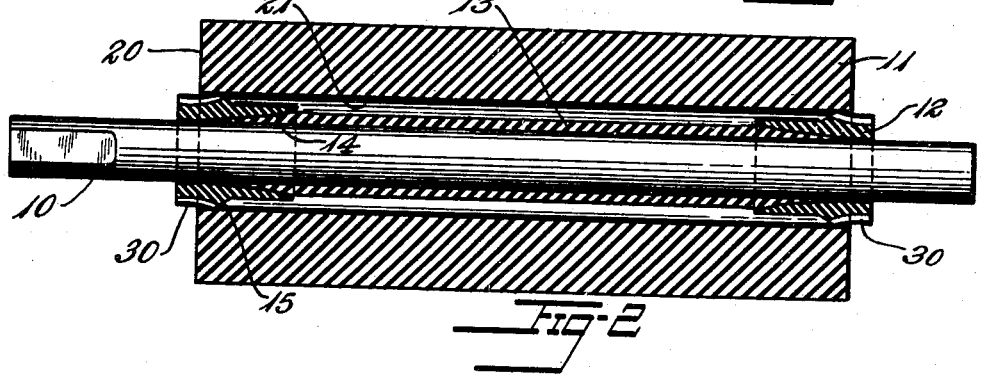
Fig. 2 is a similar view of the parts of the roll assembled for molding.
Figure 3:
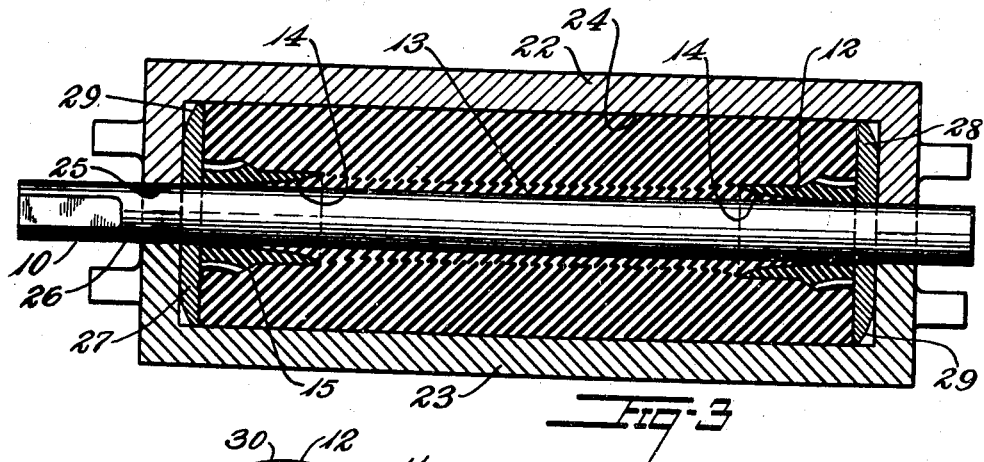
Fig. 3 is a longitudinal section of the mold with the molded roll therein.
Figure 4:
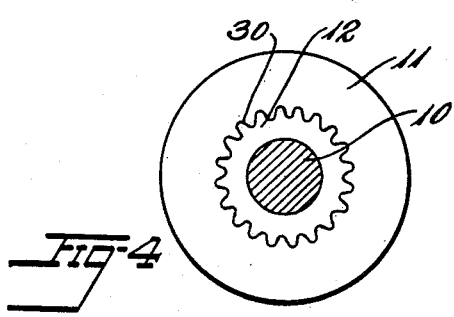
Fig. 4 is a view of the roll taken along the line 4—4 of Fig. 1.

In accordance with the invention, end bushings, incorporated with the roll during molding, are provided with tapered bores positioned to diverge from the shaft in the direction inwardly of the ends of the roll, so that softer rubber material of the roll body in the vicinity of the shaft is forced between the shaft and the bushings and adhered to both. At the ends of the roll the bushing fits close to or in contact with the shaft to act effectively as a guard. Hard rubber serves well as the material of the bushings, although metal or other firm or hard substance, to which soft rubber can be strongly adhered may be used.

In practicing the invention the following illustrative procedure may be followed. A pair of bushings, preferably molded and semicured from hard rubber composition, are cleaned and cemented, the shaft is prepared as by electroplating it with brass for adhesion, a layer of tie-gum or soft adhesive sheet rubber of substantial thickness is applied about substantially the length of the shaft to be covered to provide a layer of soft bonding material of substantial thickness, preferably however not exceeding the largest bore of the bushings, while partially occupying the space between the bore of the bushings and the shaft, the hard rubber bushings are placed over the ends of the rubber material about the shaft, a tubular body of rubber suitable for the cushion is placed over the covered shaft and the inner ends of the bushings, and confining mold members are pressed thereabout to mold the article. By providing the tapered bore in the bushings these are readily forced over the rubber material of the covering on the shaft which material fills the tapered space and provides a secure bond with the shaft. By tapering the outside of the bushings, the bushings are forced to the ends of the mold cavity during molding so that they will be positioned at the end faces of the roll.

Referring to the drawing, the numeral 10 designates a steel shaft of a wringer roll, about which is a cushion body 11 of soft vulcanized rubber. Hard rubber bushings 12 are embedded in the ends of the roll about the shaft to prevent corrosion of the shaft and deterioration of the roll body by contact with oil and grease. A layer 13 of tie-gum or soft adhesive rubber of substantial thickness as shown adapted to provide a bond between the rubber cushion and bushings and the metal shaft extends over the shaft and under the bushings. To provide for flow of the layer 13 between the bushings and the shaft, the bushing is provided with a tapered bore 14 of greater diameter toward the middle of the roll, and to provide for forcing of the bushings to the ends during the molding operation the bushings are formed with inwardly facing shoulders 15, preferably tapered to present a broad surface perpendicular to the direction of flow which is a resultant of forces applied radially and axially of the shaft.

In manufacturing the roll, the shaft is first prepared for bonding it to the rubber, preferably by electroplating the shaft with a zinc-copper alloy and coating it with rubber cement. The sheet of tie-gum or rubber composition adapted to bond readily to the metal and to the other rubber materials is then wound on the shaft to provide the covering layer 13 extending over enough of the shaft to extend about half way through the hard rubber bushings.

The bushings 12 are preferably molded of hard rubber composition and semicured. These are then cleaned, preferably by blasting them with steel shot, and are then coated inside and out with rubber cement and dried. The bushings are formed with a tapered bore larger at the innermost end than the shaft. They are forced over the shaft and over the ends of the tie-gum layer 13 to a position where they are only slightly further apart than in their final positions.

The rubber material for the cushion body is extruded to provide a tube 20 shorter than the desired covering and having a bore 21 larger than the largest diameter of the hard rubber bushings, and is compressed thereabout in a mold having a pair of mold plates 22, 23 defining therebetween a cylindrical cavity 24 of the desired roll diameter and slightly larger than the length of the desired roll body. The mold plates are also formed with half round grooves 25, 26 for centering the shaft. A pair of metal discs 27, 28 having a bore adapted to slip over the shaft and a perimeter beveled as at 29 to assist in assembling the mold and of the same diameter as the roll cavity in the mold, are slipped over the ends of the shaft before the roll parts are placed in the mold.

As the roll body material is shorter than the body of the finished roll, the material flows toward the ends of the mold cavity as the mold is closed and the pressure against the shoulders of the bushings holds them in proper position. The tie-gum is forced between the hard rubber bushings and the shaft providing a good bond therebetween. The rubber of the body becomes vulcanized in the mold by the application of heat and pressure thereto.

For increasing the strength of the union between the body and the bushings, the bushings may be provided with corrugations 30 on their outer surfaces.

Variations may be made without departing from the scope of the invention as it is defined by the following claims.

I claim:

1. A rubber-covered roll comprising a metal shaft, a body of soft rubber material upon the shaft, bushings of harder material embedded in said body at the ends of the roll, said bushings having enlarged bores at their inwardly facing ends spacing them from the shaft throughout at least a part of their extent, and a body of soft rubber bonding material of substantial thickness between said shaft and each of said bushings.

2. A rubber-covered roll comprising a metal shaft, a body of soft rubber material upon the shaft, and bushings of hard rubber material embedded in said body at the ends of the roll, said bushings having enlarged bores at their inwardly facing ends spacing them from said shaft, said bushings and shaft having an intervening layer of soft rubber bonding material of substantial thickness.

3. A rubber-covered roll comprising a metal shaft, a body of soft rubber material upon the shaft, and bushings of harder material embedded in said body at the ends of the roll, said bushings having tapered bores substantially equal in diameter to the shaft at their outer faces and having soft rubber material in the bores.

4. A rubber-covered roll comprising a metal shaft, a body of soft rubber material upon the shaft, and bushings of hard rubber material embedded in said body at the ends of the roll, said bushings having tapered bores substantially equal in diameter to said shaft at their outer faces and having their bores filled with soft rubber material adhered to the shaft and bushings.

5. A method of making a rubber-covered roll which comprises winding about a shaft a layer of sheet rubber material, placing a pair of rubber bushings partially over the ends of said layer, and molding a body of cushion sheet rubber material upon said bushings and layer, while molding the rubber material also in the bore of said bushings.

6. The method of making a rubber-covered roll which comprises applying to a shaft a layer of rubber material, placing a pair of rubber bushings having tapered bores partially over said layer, and molding a body of cushion rubber upon said bushings and layer while molding the rubber material also in the bore of said bushings.

7. The method of making a rubber-covered roll which comprises covering a shaft with unvulcanized rubber composition, placing a pair of bushings of semicured hard rubber having tapered bores over the ends of said covering, placing a cylindrical body of rubber composition about said bushings and said covering, and molding the rubber composition about said bushings and said covering and in the tapered bores of said bushings.

VIRGIL L. STOFFER.